United States Patent
Erickson

(10) Patent No.: US 12,512,109 B2
(45) Date of Patent: Dec. 30, 2025

(54) HEADSET SYSTEM FOR TRAINING, HEADSET ADAPTER AND OPERATION METHOD THEREOF

(71) Applicant: CYBER ACOUSTICS INC, Vancouver, WA (US)

(72) Inventor: Steven Erickson, Vancouver, WA (US)

(73) Assignee: CYBER ACOUSTICS INC, Vancouver, WA (US)

( * ) Notice: Subject to any disclaimer, the term of this patent is extended or adjusted under 35 U.S.C. 154(b) by 167 days.

(21) Appl. No.: 18/389,271

(22) Filed: Nov. 14, 2023

(65) Prior Publication Data

US 2025/0157478 A1 May 15, 2025

(51) Int. Cl.
| | | |
|---|---|---|
| G10L 21/02 | (2013.01) | |
| G08C 17/02 | (2006.01) | |
| H04R 1/10 | (2006.01) | |

(52) U.S. Cl.
CPC .............. *G10L 21/02* (2013.01); *G08C 17/02* (2013.01); *H04R 1/10* (2013.01); *H04R 2420/07* (2013.01)

(58) Field of Classification Search
CPC ..... G10L 21/02; G10L 21/0208; G08C 17/02; G06F 3/16; H04R 1/10; H04R 2420/07; H04R 2201/107; H04W 76/15
See application file for complete search history.

(56) References Cited

U.S. PATENT DOCUMENTS

| | | | |
|---|---|---|---|
| 9,781,503 B2 | 10/2017 | Goldman et al. | |
| 2008/0175399 A1* | 7/2008 | Kim | H04R 3/005 381/74 |
| 2009/0238396 A1* | 9/2009 | Lin | H04R 5/02 381/370 |
| 2010/0159830 A1* | 6/2010 | Findlay | H04M 3/56 455/416 |
| 2012/0238237 A1* | 9/2012 | Crestol | H04W 4/10 455/41.3 |
| 2014/0274004 A1* | 9/2014 | Koll | H04M 1/6033 455/416 |
| 2015/0063584 A1* | 3/2015 | Krisch | H04R 1/1091 381/71.6 |
| 2016/0100042 A1* | 4/2016 | Pedersen | H04M 1/05 379/420.04 |
| 2016/0192056 A1* | 6/2016 | Goldman | H04R 27/00 381/74 |
| 2017/0318374 A1* | 11/2017 | Dolenc | H04R 29/004 |
| 2019/0132443 A1* | 5/2019 | Munns | H04M 3/2227 |
| 2022/0159125 A1* | 5/2022 | Malan | H04M 3/568 |
| 2023/0403750 A1* | 12/2023 | Stephany | H04W 76/14 |

FOREIGN PATENT DOCUMENTS

CN 105739941 A 7/2016

* cited by examiner

*Primary Examiner* — Adnan Aziz
(74) *Attorney, Agent, or Firm* — Birch, Stewart, Kolasch & Birch, LLP

(57) ABSTRACT

The present disclosure is related to a headset system for training, a headset adapter and an operation method thereof. The headset adapter is electrically connected to a first headset, a second headset and an external electronic device that is for providing voice signals from customers. The headset adapter is configured to exchange the voice signals between the first headset, the second headset and the external electronic device and perform a noise reduction process on the voice signals provide by the first headset or the second headset.

18 Claims, 7 Drawing Sheets

HEADSET SYSTEM FOR TRAINING, HEADSET ADAPTER AND OPERATION METHOD THEREOF

BACKGROUND

Technical Field

The present disclosure relates to a headset system, in particular to a headset system, a headset adapter and an operating method thereof suitable for call centers.

Related Art

In order to grasp customer opinions in real time and provide required services, existing enterprises often assist customers by setting up customer service centers, where a call center is a kind of customer service center.

Generally speaking, during the personnel training phase of a call center, supervisors need to know the status of calls between trainees and customers and take over customer calls in a timely manner. The conventional approach is to implement a training system by connecting the headsets of supervisors and trainees to the call system computer using existing Quick Disconnect (QD) connectors with a Y-splitter cable, where the microphone is only enabled on one side of the Y-splitter cable. The supervisor can monitor the call of the customer through their headset, but when a supervisor needs to take over a call from a customer, the supervisor and trainee must swap the quick disconnect connections on the Y-splitter cable and establish a call connection between the customer and the supervisor's headset on the side of the Y-splitter cable with the microphone is enabled. However, since the headsets of supervisors and trainees are connected to the call system computer using quick-disconnect connectors, only the party connected to the side of the Y-splitter with the microphone enabled can talk to the customer, and the other party can only listen to the call content from the customer and cannot communicate with the customer or hear the communication from the other party to the customer through their headset. As a result, the supervisor is unable to grasp the content of the call between the trainee and the customer, and is unable to give the trainee the necessary instructions or assistance immediately. In addition, trainees are unable to observe the conversations between supervisors and customers and learn service skills from them, resulting in low training efficiency. In addition, since the supervisor-side headset needs to remain connected to the quick-disconnect connector, the activity space of the supervisor is restricted due to the limitations of the wiring. When the number of trainees increases, frequent plugging and unplugging of lines becomes more time-consuming and labor-intensive, making the training system inconvenient to use. In Addition, because the use of Quick Disconnect connectors is an analog connection and not a digital system it is not possible to implement noise cancellation technology in the training system to reduce the background noise from the call center environment. This background noise is captured by the headset microphone of the trainee and supervisor, which is heard by the customer during the call making it difficult to understand the trainee or supervisor communicating with the customer reducing the quality of the customer service experience of the customer.

SUMMARY

In view of the above-mentioned deficiencies in the prior art, the main purpose of the present invention is to provide a headset system for training, a headset adapter and an operating method thereof, enabling the two headsets connected through the training headset system to simultaneously receive external voice signals from the customer, to monitor the call content between the other party and the customer, and to establish a communication connection with the headset wirelessly to achieve the purpose of a convenient and effective training headset system.

In one embodiment, a headset adapter of the present disclosure is adapted to be electrically connected to a first headset and a second headset, the first headset is configured to generate a first voice signal, and the second headset is configured to generate a second voice signal. The headset adapter includes a wireless communication module, a digital signal processing module, a switching unit and a digital communication module. The digital communication module is configured to electrically connect to an external electronic device and configured to receive an external voice signal from the external electronic device. The digital signal processing module is electrically connected to the digital communication module, configured to receive the external voice signal from the digital communication module, receives the second voice signal, and transmits the external voice signal to the second headset. The wireless communication module is electrically connected to the digital signal processing module and the first headset, configured to receive the external voice signal from the digital signal processing module and to receive the first voice signal, and transmits the external voice signal to the first headset. The switch unit is electrically connected to the digital signal processing module, configured to selectively receive the first voice signal or the second voice signal based on a switch control signal, and transmits the received first voice signal or the second voice signal to the digital signal processing module.

In one embodiment, a headset system for training of the present disclosure includes the aforementioned headset adapter and a second headset.

In one embodiment, an operation method for a headset adapter includes wirelessly connecting a first headset to the headset adapter; receiving an external voice signal from an external electronic device, and enabling the external voice signal to be transmitted to the first headset and the second headset; receiving a first voice signal from the first headset or a second voice signal from a second headset; and selectively transmitting the first voice signal or the second voice signal to the external electronic device based on a received switch control signal.

Based on the above disclosure, since the headset adapter of the present disclosure includes a wireless communication module, the headset adapter can establish a communication connection with the headset through wireless communication. Therefore, the movement range of the headset is not limited by the physical line, and can quickly and conveniently establish a communication connection with the headset adapter. At the same time, the headset adapter of the present disclosure is configured to provide the received external voice signal to the first headset and the second headset at the same time and provide the voice signal of the first headset or the second headset to the other headset of the two headsets. Therefore, the first headset and the second headset can monitor the voice signal from a third party (for example, a customer) at the same time and monitor the voice signal from the other one. Users of the first headset and the second headset can instantly grasp the call content, thereby effectively improving personnel training efficiency. Therefore, the headset system for training, the headset adapter and the operating method thereof of the disclosure may achieve the purpose of a convenient and effective training headset system.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
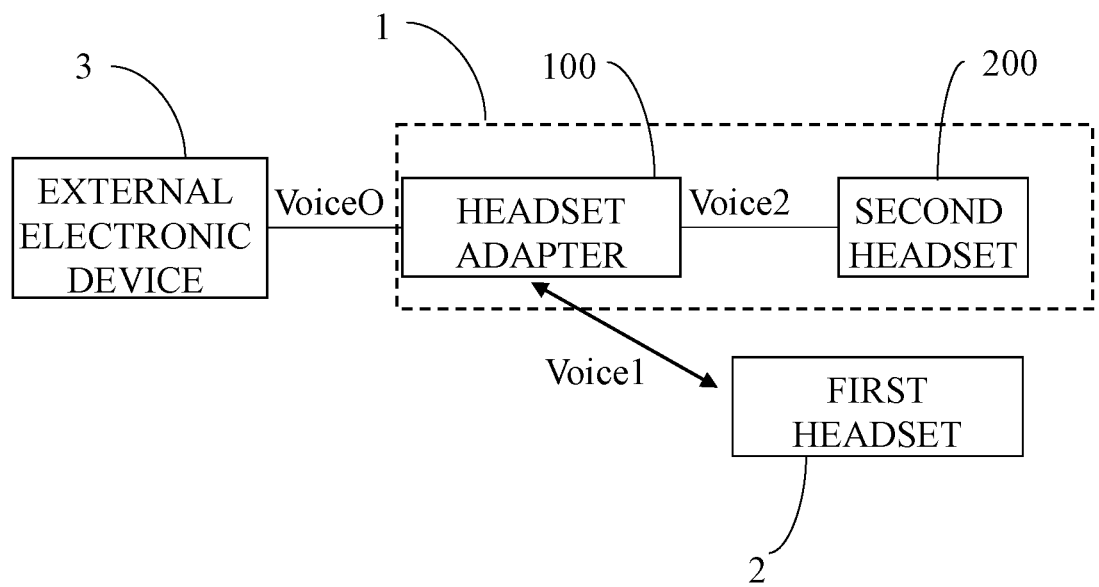
FIG. 1 is a schematic diagram of an implementation environment of a headset system according to one embodiment of the present disclosure.

FIG. 1 is a schematic diagram of an implementation environment of a headset system according to one embodiment of the present disclosure. The headset system 1 is electrically connected to an external electronic device 3 and a first headset 2. The headset system 1 includes a headset adapter 100 and a second headset 200. In some embodiments, the first headset 2 and the second headset 200 comprises an earphone and a microphone, respectively. In some embodiments, the first headset 2 or the second headset 200 may be a headphone with microphone or an earphone with microphone.

The external electronic device 3 is an electronic device installed with application software corresponding to the call center system and capable of receiving calls from the customer's communication device. The external electronic device 3 is configured to transmit the external voice signal Voice0 generated by the communication device call to the headset adapter 100.

In one embodiment, the external electronic device 3 is, for example, a host server, a laptop, etc., and the present disclosure is not limited thereto.

The first headset 2 is configured to generate a first voice signal Voice1, and the second headset 200 is configured to generate a second voice signal Voice2. The first headset 2 and the second headset 200 include at least a speaker unit and a microphone unit. The speaker unit is used to play the received analog audio signal, and the microphone unit is used to capture the sound signal to generate an analog voice signal corresponding to the first voice signal Voice1 and the second voice signal Voice2. In this embodiment, the first headset 2 is a Bluetooth headset.

The headset adapter 100 is electrically connected to the first headset 2 and the second headset 200. The headset adapter 100 is configured to receive the external voice signal Voice0 and provide the external voice signal Voice0 to the first headset 2 and the second headset 200 simultaneously. The headset adapter 100 is configured to receive the first voice signal Voice1 and the second voice signal Voice2, and to transmit the first voice signal Voice1 or the second voice signal Voice2 to the external electronic device 3 so that the first voice signal Voice1 or the second voice signal Voice2 is provided to the client's communication device through the external electronic device 3.

Figure 2:
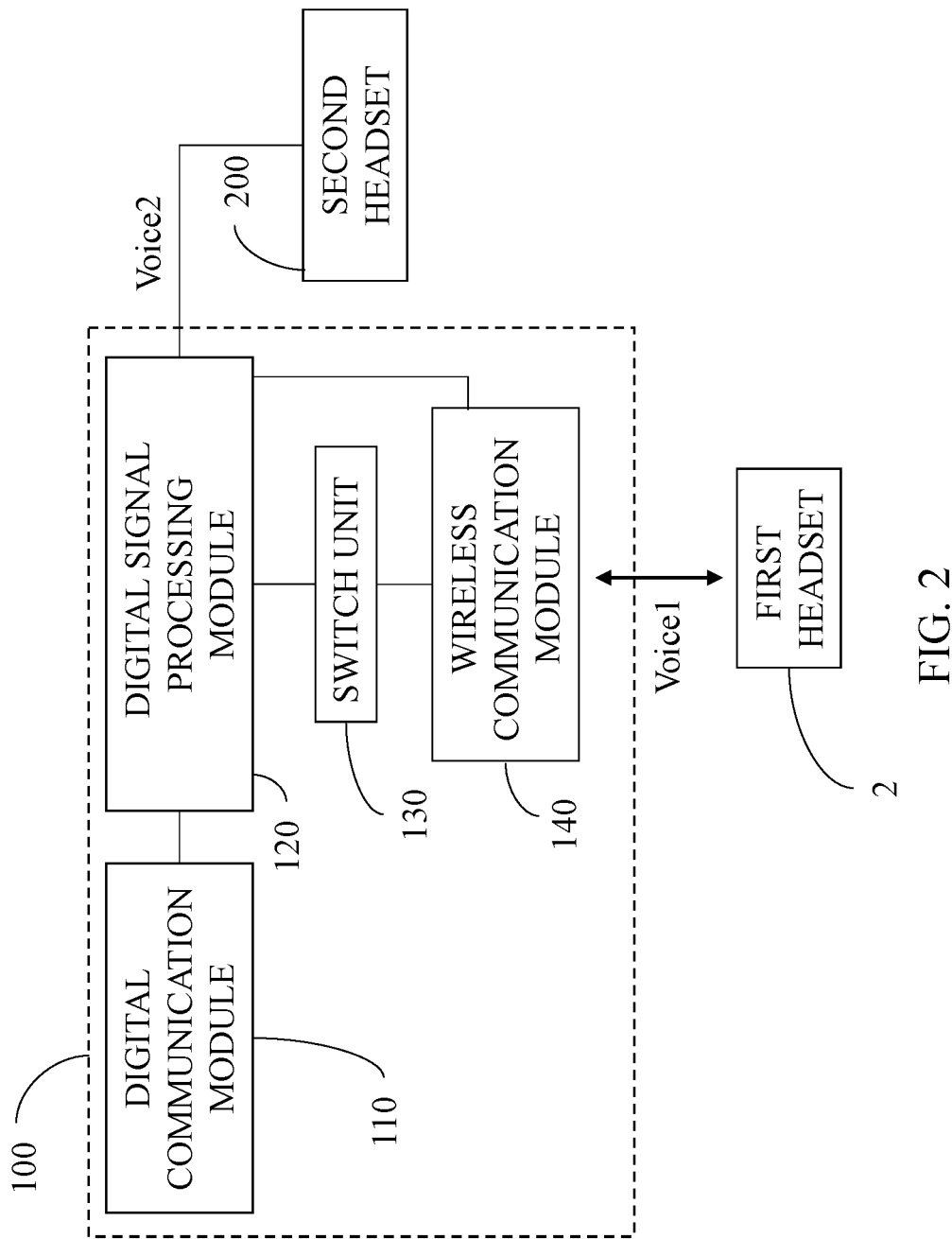
FIG. 2 is a schematic structural diagram of a headset adapter according to one embodiment of the present disclosure.

Please refer to FIG. 2. Further, the headset adapter 100 includes a digital communication module 110, a digital signal processing module 120, a switch unit 130 and a wireless communication module 140.

The digital communication module 110 is electrically connected to the external electronic device 3, the digital signal processing module 120 and the switch unit 130. The digital communication module 110 is configured to receive the external voice signal VoiceO from the external electronic device 3 and transmit the external voice signal VoiceO to the digital communication module 110. In this embodiment, the digital communication module 110 is a communication circuit that complies with a USB audio device class specification (USB Audio) and is connected to the external electronic device 3 through a USB connector. The digital signal processing module 120 is electrically connected to the switch unit 130 and the second headset 200. The digital signal processing module 120 is configured to receive the external voice signal VoiceO from the digital communication module 110 and transmit the external voice signal VoiceO to the wireless communication module 140 and the second headset 200. The digital signal processing module 120 is configured to receive a voice signal (the first voice signal Voice1 or the second voice signal Voice2) provided from the switch unit 130, and transmit the voice signal provided by the switch unit 130 to the digital signal communication module 110. The digital signal processing module 120 is configured to receive the first voice signal Voice1 provided by the first headset 2 and transmit the first voice signal Voice1 provided by the first headset 2 to the second headset. 200. The digital signal processing module 120 is configured to receive the second voice signal Voice2 provided by the second headset 200 and transmit the second voice signal Voice2 provided by the second headset 2 to the first headset 2. In this embodiment, the digital signal processing module 120 can be implemented by a Digital Signal Processor (DSP).

The switch unit 130 is electrically connected to the digital signal processing module 120. The switch unit 130 is configured to selectively be electrically connected to the wireless communication module 140 or the digital signal processing module 120 based on a switch control signal to receive the first voice signal Voice1 from the wireless communication module 140 or to receive the first voice signal Voice1 from the wireless communication module 140 or receive the second voice signal Voice2 from the digital signal processing module 120 and transmits the received first voice signal Voice1 or the second voice signal Voice2 to the digital signal processing module 120. In this embodiment, the switch unit 130 may be implemented by a switch circuit. In one embodiment, the switch unit 130 can also be implemented by a switch circuit built in the digital signal processing module 120, and this disclosure is not limited thereto.

The wireless communication module 140 is electrically connected to the digital signal processing module 120, the switch unit 130 and the first headset. The wireless communication module 140 establishes a communication connection with the first headset 2 through wireless communication. The wireless communication module 140 is configured to receive the external voice signal VoiceO from the digital signal processing module 120 and the first voice signal Voice1 from the first headset 2, and transmit the external voice signal VoiceO is transmitted to the first headset by way of wireless communication. In this embodiment, the wireless communication module 140 may be a Bluetooth communication chip.

In one embodiment, the first voice signal Voice1 received by the wireless communication module 140 is a noise-reduced voice signal. The noise reduction process performed on the first voice signal is a noise reduction program based on Environmental Noise Cancellation (ENC) technology, and this disclosure is not limited thereto.

Figure 3:
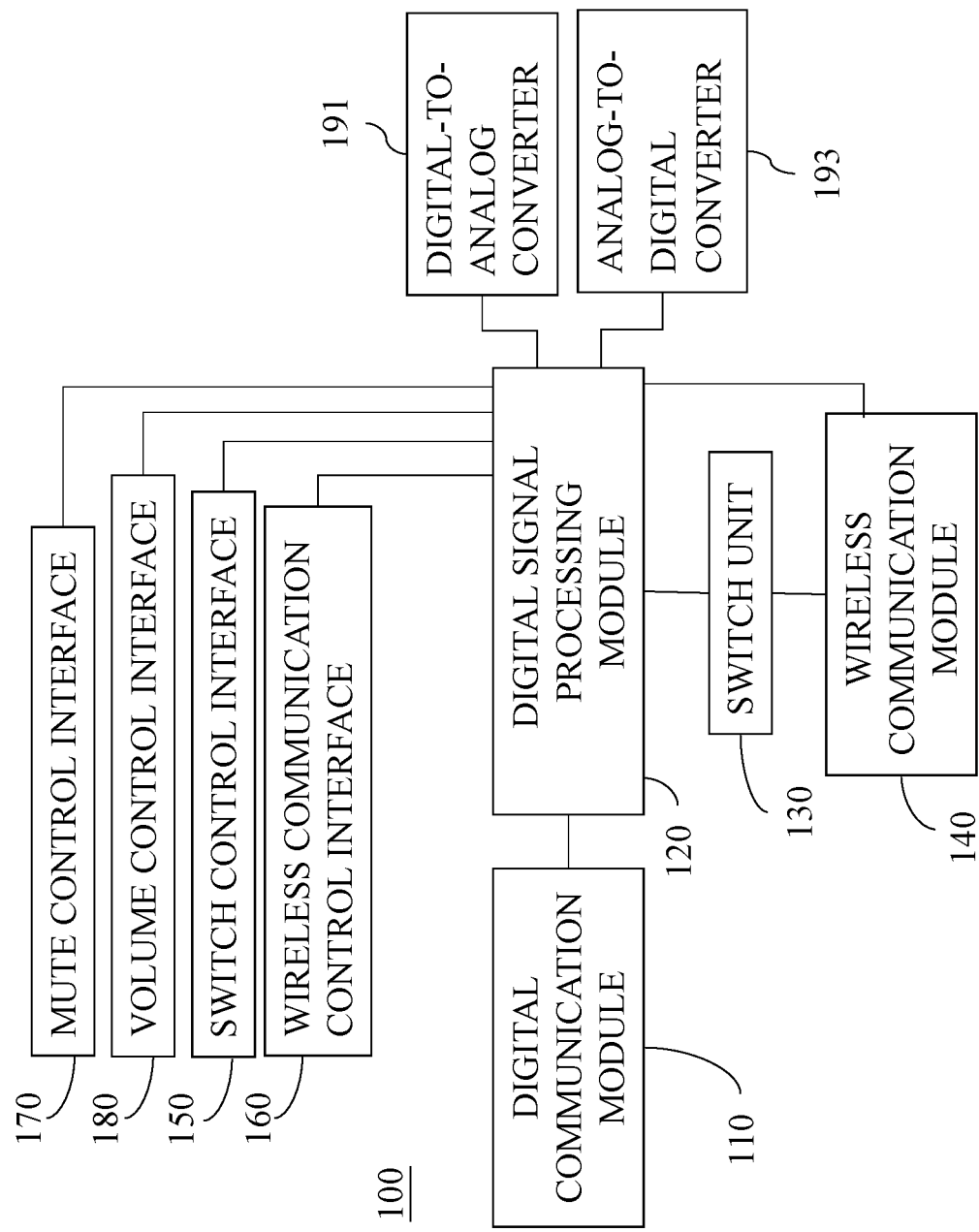
FIG. 3 is a schematic structural diagram of a headset adapter according to another embodiment of the present disclosure.

Please refer to FIG. 3. The headset adapter 100 may further include a switch control interface 150 and a wireless communication control interface 160. The switch control interface 150 is electrically connected to the digital signal processing module 120 and is configured to generate a switch control signal corresponding to a user's operation and transmit the switch control signal to the digital signal processing module 120. Thereby, the digital signal processing module 120 switches the connection state of the switch unit 130 according to the received switch control signal. The wireless communication control interface 160 is electrically connected to the digital signal processing module 120. The wireless communication control interface 160 is configured to generate a wireless communication control signal corresponding to the user's operation and transmit the wireless communication control signal to the digital signal processing module 120. Thereby, the digital signal processing module 120 can determine whether to enable the wireless communication module 140 to perform a pairing process or a connection process between the first headset 2 and the wireless communication module 140 based on the received wireless communication control signal.

In other embodiments, the headset adapter 100 may further include a mute control interface 170 and a volume control interface 180. The mute control interface 170 is electrically connected to the digital signal processing module 120 and is configured to generate a mute control signal corresponding to a user's operation and transmit the mute control signal to the digital signal processing module 120. Thereby, the digital signal processing module 120 would not transmit the voice signal (the first voice signal Voice1 or the second voice signal Voice2) from the switch unit 130 to the digital communication module based on the mute control signal to block the output of voice signals. The volume control interface 180 is electrically connected to the digital signal processing module 120 and is configured to generate a volume control signal corresponding to a user's operation and transmit the volume control signal to the digital signal processing module 120. Thereby, the digital signal processing module 120 can adjust the volume of the output voice signal (the first voice signal Voice1 or the external voice signal VoiceO) based on the volume control signal.

In one embodiment, the switch control interface 150, the wireless communication control interface 160, the mute control interface 170 and the volume control interface 180 can be implemented by physical buttons. In another embodiment, the switch control interface 150, the wireless communication control interface 160, the mute control interface 170 and the volume control interface 180 can be implemented by a touch panel, and the present disclosure is not limited thereto.

The headset adapter 100 also includes a digital-to-analog converter 191 and an analog-to-digital converter 193. The digital-to-analog converter 191 is electrically connected to the digital signal processing module 120 and the second headset 200. The digital-to-analog converter 191 receives the first voice signal Voice1 or the external voice signal VoiceO from the digital signal processing module 120. The digital-to-analog converter 191 converts the received voice signal into an analog audio signal that the second headset 200 can play, and transmits the analog audio signal to the second headset 200. The analog-to-digital converter 193 is electrically connected to the digital signal processing module 120 and the second headset 200. The analog-to-digital converter 193 receives the analog voice signal transmitted by the second headset 200, converts the analog voice signal into the corresponding second voice signal Voice2, and transmits the second voice signal Voice2 to the digital signal processing module 120.

Based on the above disclosure, since the headset adapter 100 of the present disclosure includes the wireless communication module 140, the headset adapter 100 can establish a communication connection with the first headset 2 (the headset of supervisor) through wireless communication. Therefore, the movement range of the first headset 2 is not limited by the physical line, and can quickly and conveniently establish a communication connection with the headset adapter 100. At the same time, the headset adapter 100 of the present disclosure is configured to provide the received external voice signal to the first headset 2 and the second headset 200 at the same time and provide the voice signal of the first headset 2 or the second headset 200 to the other headset of the two headsets. Therefore, the first headset 2 and the second headset 200 can monitor the voice signal from a customer at the same time and monitor the voice signal from the other one. Users of the first headset 2 and the second headset 200 can instantly grasp the call content, thereby effectively improving personnel training efficiency.

Figure 4:
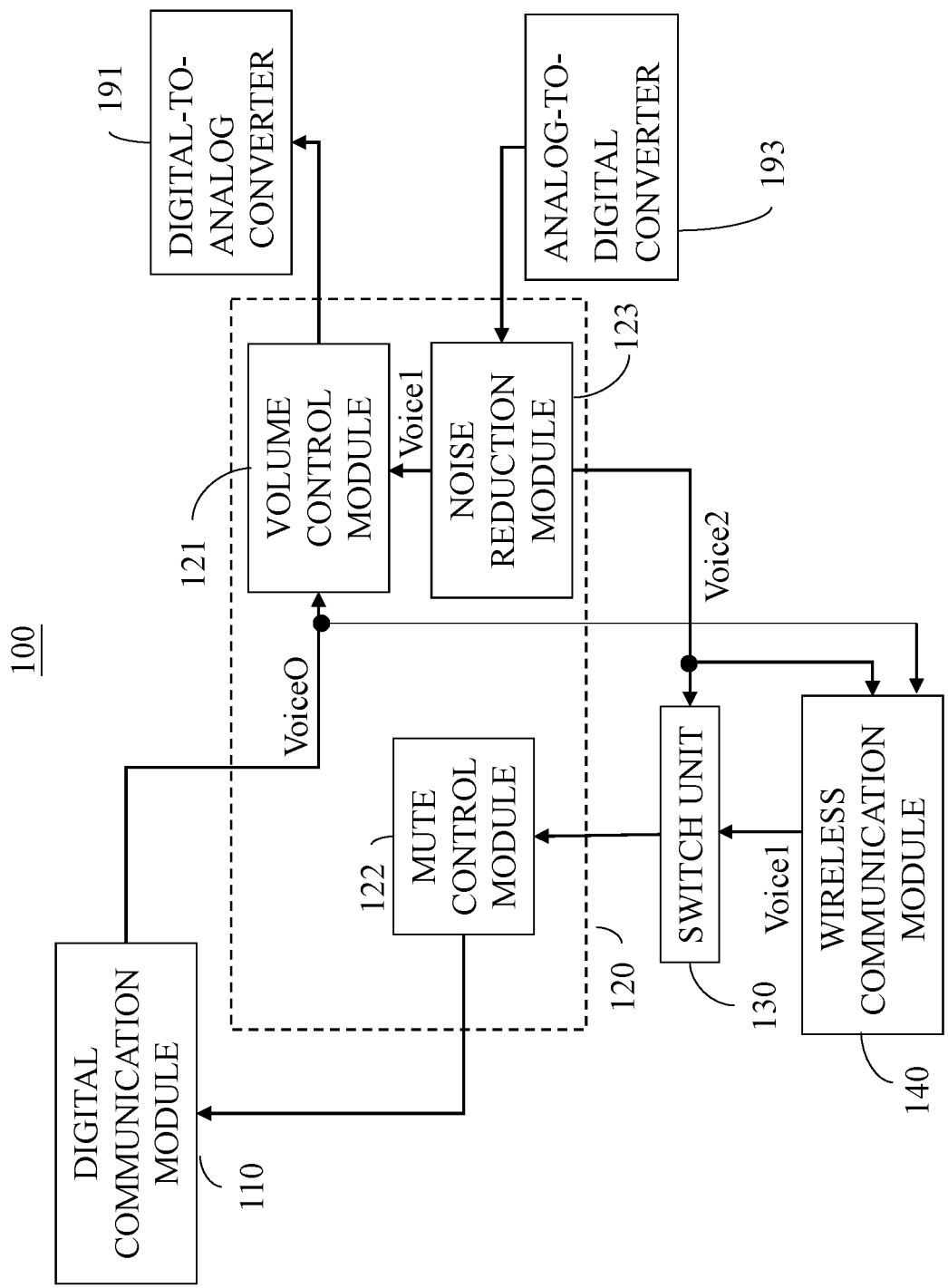
FIG. 4 is a schematic structural diagram of a headset adapter according to another embodiment of the present disclosure.

Refer to FIG. 4. The digital signal processing module 120 further includes a volume control module 121, a mute control module 122 and a noise reduction module 123. The volume control module 121 is configured to receive a voice signal (the first voice signal Voice1 or the external voice signal VoiceO), and adjust the volume of the output voice signal (the first voice signal Voice1 or the external voice signal VoiceO) based on the volume control signal received by the digital signal processing module 120. The noise reduction module 123 is configured to receive the second voice signal Voice2 and perform noise reduction processing on the second voice signal Voice2. Therefore, background noises captured by the second headset 200 can be reduced by noise reduction module 123 to improve the audio quality of the second voice signal Voice2. The noise-reduced second voice signal Voice2 is sent to the switch unit 130 and the wireless communication module 140. In one embodiment, the noise reduction process is a noise reduction procedure based on Environmental Noise Cancellation (ENC) technology, and this disclosure is not limited to this. The mute control module 122 is configured to receive a voice signal (the first voice signal Voice1 or the second voice signal Voice2) from the switch unit 130, and does not transmit the voice signal from the switch unit 130 to the digital communication module 110 based on the mute control signal received by the digital signal processing module 120.

In this embodiment, the volume control module 121, the mute control module 122 and the noise reduction module 123 can be implemented by the digital signal processing module 120 executing corresponding programs, and this disclosure is not limited thereto.

Figure 5:
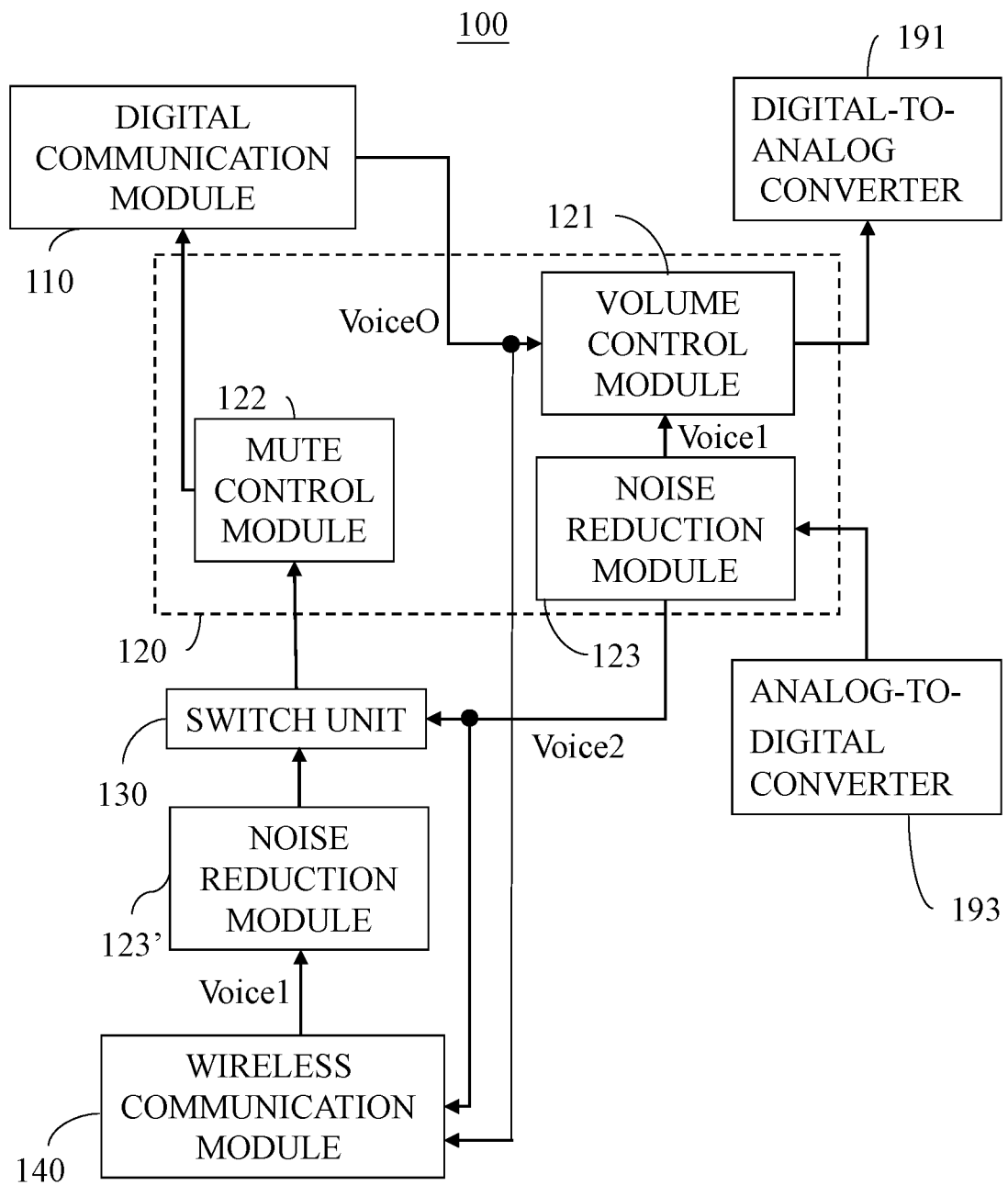
FIG. 5 is a schematic structural diagram of a headset adapter according to another embodiment of the present disclosure.

Refer to FIG. 5. FIG. 5 is a schematic structural diagram of a headset adapter according to another embodiment of the present disclosure. In this embodiment, the wireless communication module 140 of the headset adapter 100' is electrically connected to a noise reduction module 123'. The noise reduction module 123' is configured to receive the first voice signal Voice1 and perform noise reduction processing on the first voice signal Voice1 to improve the audio quality of the first voice signal Voice1. The noise reduction module 123' transmits the noise-reduced first voice signal Voice1 to the switch unit 130. In one embodiment, the noise reduction process is a noise reduction procedure based on Environmental Noise Cancellation (ENC) technology, and this disclosure is not limited to this. In one embodiment, the noise reduction module 123' can be directly implemented by the noise reduction module 123, and this disclosure is not limited thereto.

Figure 6:
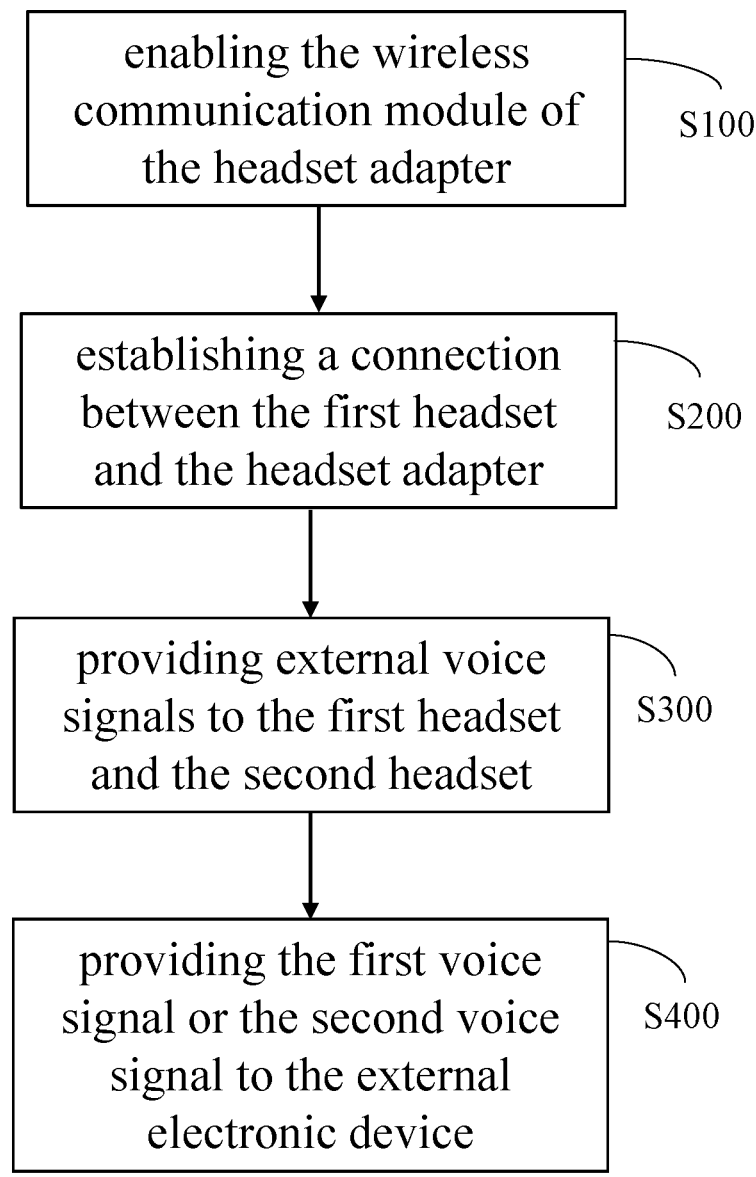
FIG. 6 is a schematic diagram of an operating method of the headset adapter according to one embodiment of the present disclosure.

The operation method of the headset adapter of the present disclosure is explained below with reference to FIGS. 1 to 6. In this embodiment, the first headset 2 is worn by the supervisor and the second headset 200 is worn by the trainee as an example. FIG. 6 is a schematic diagram of an operating method of the headset adapter according to the embodiment of the present disclosure, which includes steps $100 to S400.

Step S100: enabling the wireless communication module of the headset adapter. In this step, the trainee can control the wireless communication control interface 160 of the headset adapter 100 by pressing or touching to generate the wireless communication control signal to enable the wireless communication module 140 of the headset adapter 100.

Step S200: establishing a connection between the first headset and the headset adapter. In this step, the supervisor wears the first headset 2 and moves within the wireless communication range of the headset adapter 100, so that the first headset 2 and the wireless communication module 140 perform a connection process based on the completed pairing process to establish a communication connection.

Step S300: providing external voice signals to the first headset and the second headset. In this step, the headset adapter 100 provides the received external voice signal VoiceO to the first headset 2 and the second headset 200 at the same time, whereby both the supervisor and the trainee can listen to the external voice signal VoiceO from the client.

Step S400: providing the first voice signal or the second voice signal to the external electronic device. In this step, while the first voice signal Voice1 or the second voice signal Voice2 is provided to the external electronic device, the first voice signal Voice1 or the second voice signal Voice2 is also provided to the first headset 2 or the second headset 200. For example, in one embodiment, while the first voice signal Voice1 is provided to the external electronic device, the first voice signal Voice1 is simultaneously transmitted to the second headset 200. Therefore, trainees can listen in on the conversation between the supervisor and the customer while the supervisor is talking to the customer. In another embodiment, while the second voice signal Voice2 is provided to the external electronic device, the second voice signal Voice2 is simultaneously transmitted to the first headset 200. Therefore, the supervisor can monitor the content of the call between the trainee and the customer while the trainee is talking to the customer. With this, supervisors or trainees can directly monitor the other party's call content using the headset, effectively improving the efficiency of personnel training.

Figure 7:
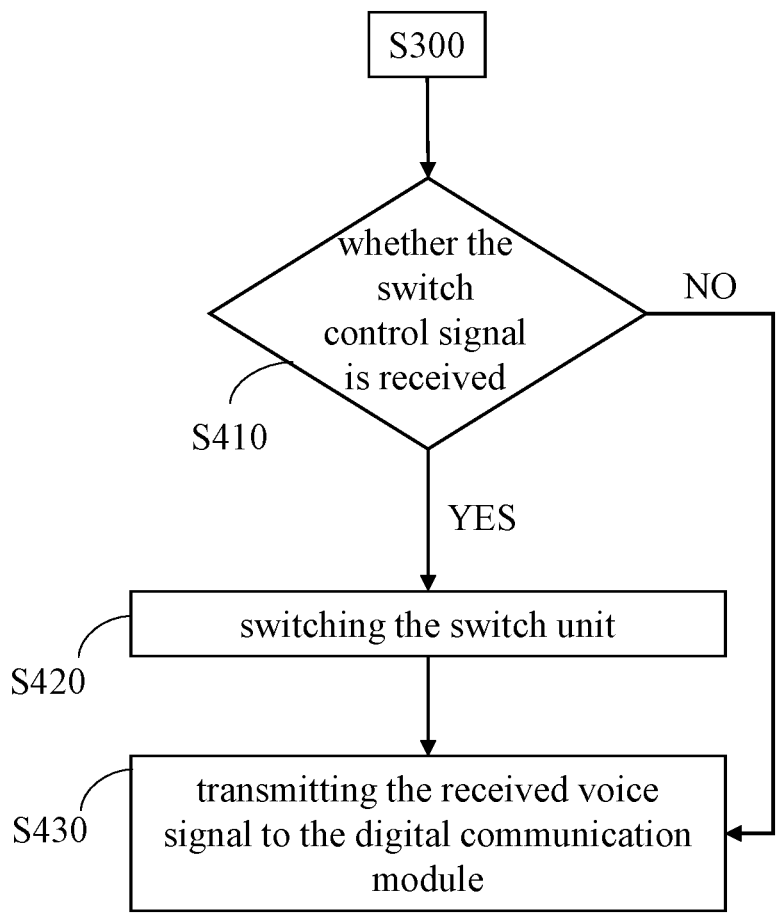
FIG. 7 is a schematic diagram of an operating method of the headset adapter according to another embodiment of the present disclosure.

Further, step S400 further includes the following steps. Please refer to FIG. 7, including steps S410~S430.

Step S410: determining whether the switch control signal is received. When it is determined that the switch control signal is received, proceed to step S420; otherwise, proceed to step S430. In this step, the supervisor or trainee can control the switch control interface 150 of the headset adapter 100 to generate the switch control signal by pressing or touching. When the digital signal processing module 120 receives the switch control signal, it determines as yes; otherwise, the digital signal processing module 120 determines as no.

Step S420: switching the switch unit. In this step, since the digital signal processing module 120 determines that the switch control signal is received, the digital signal processing module 120 controls the switch unit to switch based on the switch control signal. For example, the switch unit 130 switches from a state of receiving the first voice signal Voice1 from the wireless communication module 140 to a state of receiving the second voice signal Voice2 from the noise reduction module 123.

Step S430: transmitting the received voice signal to the digital communication module. In this step, the switch unit 130 transmits the received voice signal to the digital communication module so that the voice signal can be transmitted to the external electronic device 3. In one embodiment, the switch unit 130 transmits the received voice signal to the mute control module 122. The digital signal processing module 120 determines whether to transmit the voice signal from the switch unit 130 to the digital communication module 110 according to whether the mute control signal is received. When the digital signal processing module 120 receives the mute control signal, the digital signal processing module 120 does not transmit the voice signal from the switch unit 130 to the digital communication module 110. When the digital signal processing module 120 does not receive the mute control signal, the voice signal from the switch unit 130 is transmitted to the digital communication module 110.

To sum up, since the headset adapter of the present disclosure includes a wireless communication module, it can establish a communication connection with the headset through wireless communication. Therefore, the movement range of the headset would not be limited by the physical line, and the headset adapter can quickly and conveniently establishes or disconnects a communication connection with the headset. At the same time, the headset adapter of the present disclosure is configured to provide the received external voice signal to the first headset and the second headset at the same time and provide the voice signal of the first headset or the second headset to the other headset of the two headsets, so the first headset and the second headset can simultaneously monitor voice signals from a third party (for example, a customer) and monitor voice signal from the other one. Users of the first headset and the second headset can instantly grasp the call content, thereby effectively improving personnel training efficiency. Furthermore, this disclosure only uses a simple circuit structure to achieve switching between different voice signals, and can directly provide the voice signals of both parties (supervisors and trainees) to the other party's headset. Complex disclosure software or cumbersome circuit systems are not required, further reducing the manufacturing cost of the headset adapter. Moreover, since the headset adapter of the disclosure is implemented by a digital system but not an analog system, the noise cancellation technology can be applied in the headset adapter of the disclosure to improve the quality of the voice signals from the first headset or the second headset. The quality of the customer service experience of the customer is improved. Therefore, the headset system for training, the headset adapter and operation method proposed in this disclosure can achieve the purpose of providing a convenient and effective training headset system.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A headset adapter, adapted to be electrically connected to a first headset, a second headset and an external electronic device, the first headset configured to generate a first voice signal, the second headset configured to generate a second voice signal, the headset adapter comprising:
    a digital communication circuit configured to electrically connect to the external electronic device, configured to receive an external voice signal from the external electronic device and configured to transmit the first voice signal or the second voice signal to the external electronic device;
    a digital signal processor, electrically connected to the digital communication circuit, the digital signal processor being configured to receive the external voice signal from the digital communication circuit, receive the second voice signal, and transmit the external voice signal to the second headset;
    a wireless communication circuit, electrically connected to the digital signal processor and the first headset, the wireless communication circuit being configured to receive the external voice signal from the digital signal processor, receive the first voice signal, and transmit the external voice signal to the first headset; and
    a switch unit, electrically connected between the digital signal processor and the wireless communication circuit, the switch unit being configured to selectively receive the first voice signal or the second voice signal based on a switch control signal, and transmit the received first voice signal or the received second voice signal to the digital signal processor,
    wherein the headset adapter does not configure with a USB host controller.

2. The headset adapter according to claim 1, wherein the headset adapter is configured to transmit the first voice signal to the second headset and to transmit the second voice signal to the first headset.

3. The headset adapter according to claim 1, further comprising:
    a switch control interface, electrically connected to the digital signal processor and configured to generate the switch control signal and transmit the switch control signal to the digital signal processor; and
    a wireless communication control interface, electrically connected to the digital signal processor and configured to generate a wireless communication control signal and to transmit the wireless communication control signal to the digital signal processor.

4. The headset adapter according to claim 3, wherein the digital signal processor is configured to determine whether to enable the wireless communication circuit to perform a pairing process or a connection process between the first headset and the wireless communication circuit based on the wireless communication control signal; and the digital signal processor is configured to control the switch unit to be electrically connected to the wireless communication circuit or the digital signal processor based on the switch control signal.

5. The headset adapter according to claim 1, wherein the first headset is a Bluetooth headset.

6. The headset adapter according to claim 1, wherein the wireless communication circuit is a Bluetooth communication chip.

7. The headset adapter according to claim 1, wherein the digital communication circuit is a communication circuit that complies with a USB audio device class specification.

8. The headset adapter according to claim 1, wherein the switch unit is a switch circuit.

9. The headset adapter according to claim 1, wherein the digital signal processor further includes a noise reduction module; the noise reduction module is configured to receive the second voice signal, perform noise reduction processing on the second voice signal, and transmit the noise-reduced second voice signal to the switch unit and the wireless communication circuit.

10. The headset adapter according to claim 9, wherein the noise reduction module is configured to receive the first voice signal from the wireless communication circuit, perform noise reduction processing on the first voice signal, and transmit the noise-reduced first voice signal to the switch unit.

11. A headset system for training, comprising: the headset adapter according to claim 1 and a second headset.

12. The headset adapter according to claim 1, the digital communication module circuit comprising:
a mute control module, configured to receive the first voice signal or the second voice signal from the switch unit, wherein the mute control module does not transmit the first voice signal or the second voice signal from the switch unit to the digital communication circuit based on a mute control signal received by the digital signal processor.

13. The headset adapter according to claim 1, the digital communication module circuit comprising:
a volume control module, configured to receive the first voice signal or the external voice signal, and adjust the volume of the first voice signal or the external voice signal based on a volume control signal received by the digital signal processor.

14. The headset adapter according to claim 9, wherein the noise reduction processing is a noise reduction procedure based on an Environmental Noise Cancellation technology.

15. An operating method of a headset system comprising a headset adapter which does not configure with a USB host controller, comprising:
wirelessly connecting a first headset to the headset adapter;
receiving an external voice signal from an external electronic device electrically connected to the headset adapter, and enabling the external voice signal to be transmitted to the first headset and a second headset of the headset system;
receiving a first voice signal from the first headset or a second voice signal from the second headset by the headset adapter; and
selectively transmitting the first voice signal or the second voice signal to the external electronic device through a single digital communication circuit of the headset adapter based on a received switch control signal.

16. The operating method of a headset system according to claim 15, further comprises transmitting the first voice signal to the second headset or send the second voice signal to the first headset.

17. The operating method of a headset system according to claim 15, further comprises performing a pairing process or a connection process between the first headset and the headset adapter based on a received wireless communication control signal.

18. The operating method of a headset system according to claim 15, further comprising:
muting the first voice signal or the second voice signal according to a mute control signal by the headset adapter.

* * * * *